US011351928B2

(12) United States Patent
D'Angelo et al.

(10) Patent No.: US 11,351,928 B2
(45) Date of Patent: Jun. 7, 2022

(54) TORQUE LIMITING CLAMP ACTUATOR

(71) Applicant: Yakima Products, Inc., Lake Oswego, OR (US)

(72) Inventors: Gian-Marco D'Angelo, Portland, OR (US); Kevin Lesley, Beaverton, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 0 days.

(21) Appl. No.: 16/889,577

(22) Filed: Jun. 1, 2020

(65) Prior Publication Data

US 2020/0376631 A1 Dec. 3, 2020

Related U.S. Application Data

(60) Provisional application No. 62/856,671, filed on Jun. 3, 2019.

(51) Int. Cl.
*B60R 9/048* (2006.01)
*B60R 9/058* (2006.01)
*B25B 5/04* (2006.01)
*B25B 5/10* (2006.01)
*B25B 23/14* (2006.01)
*B25B 23/142* (2006.01)
*B60R 11/00* (2006.01)
*B60R 9/055* (2006.01)

(52) U.S. Cl.
CPC ............... *B60R 9/058* (2013.01); *B25B 5/04* (2013.01); *B25B 5/106* (2013.01); *B25B 23/141* (2013.01); *B25B 23/1427* (2013.01); *B60R 9/048* (2013.01); *B60R 9/055* (2013.01); *B60R 2011/004* (2013.01); *B60R 2011/0071* (2013.01)

(58) Field of Classification Search
CPC ...... B60R 9/055; B60R 9/058; B25B 23/1427
USPC .................................................. 73/862.21
See application file for complete search history.

(56) References Cited

U.S. PATENT DOCUMENTS

| 1,313,687 | A | 8/1919 | Hellweg |
| 2,483,947 | A | 10/1947 | Turner |
| 3,008,177 | A | 11/1961 | Wooten, Jr. |
| 3,366,295 | A | 1/1968 | Nygaard |
| 3,677,196 | A | 7/1972 | Schuller |
| 4,217,999 | A | 8/1980 | Forsman |
| 4,249,684 | A | 2/1981 | Miller et al. |
| 4,274,568 | A | 6/1981 | Bott |
| 4,378,898 | A | 4/1983 | Smeenge et al. |
| 4,406,387 | A | 9/1983 | Rasor |
| 4,420,105 | A | 12/1983 | Nepper |
| 4,848,112 | A | 7/1989 | Graber et al. |
| 5,280,848 | A | 1/1994 | Moore |
| 5,419,479 | A | 5/1995 | Evels et al. |

(Continued)

FOREIGN PATENT DOCUMENTS

| DE | 2804588 A1 | 8/1979 |
| DE | 3837209 C1 | 3/1990 |

(Continued)

*Primary Examiner* — Scott T McNurlen
(74) *Attorney, Agent, or Firm* — Kolisch Hartwell, P.C.

(57) ABSTRACT

A clamp includes a jaw assembly, and an actuator device for moving the jaw assembly between clamped and unclamped positions. The actuator device includes a handle, and a keyed shaft coupled to the handle via a spring biased releasable torque transfer mechanism.

20 Claims, 7 Drawing Sheets

(56) References Cited

U.S. PATENT DOCUMENTS

| | | |
|---|---|---|
| 5,492,258 A | 2/1996 | Brunner |
| 5,546,705 A | 8/1996 | Hirtsiefer |
| 5,582,313 A | 12/1996 | Envall |
| 5,582,316 A | 12/1996 | Masayoshi et al. |
| 5,598,959 A | 2/1997 | Lorensen et al. |
| 5,762,244 A | 6/1998 | Wagner et al. |
| 5,823,411 A | 10/1998 | Gronwoldt et al. |
| 5,845,828 A | 12/1998 | Settelmayer |
| 5,947,356 A | 9/1999 | Delong |
| 6,145,719 A | 11/2000 | Robert |
| 6,273,311 B1 | 8/2001 | Pedrini |
| 6,296,161 B1 | 10/2001 | Van der Feen et al. |
| 6,463,627 B1 | 10/2002 | Hirtsiefer |
| 6,681,971 B2 | 1/2004 | Laverack et al. |
| 6,789,357 B1 | 9/2004 | McCullough |
| 6,918,521 B2 | 7/2005 | Settelmayer et al. |
| 7,416,098 B2 * | 8/2008 | Settelmayer ............ B60R 9/058 224/309 |
| 7,637,405 B2 | 12/2009 | Emmerling et al. |
| 8,075,065 B2 | 12/2011 | Mercat et al. |
| 8,225,679 B2 * | 7/2012 | Flaherty ................. B60R 9/058 73/862.21 |
| 8,915,411 B2 * | 12/2014 | Steckel ................... B60R 9/045 224/324 |
| 9,409,285 B2 * | 8/2016 | Ivinson ................. B25B 23/141 |
| 9,643,542 B2 * | 5/2017 | Aftanas ................... B60R 9/052 |
| 9,725,045 B2 * | 8/2017 | Johansson ........... B25B 23/1422 |
| 10,034,701 B2 * | 7/2018 | Adamiec ............. B25B 23/1427 |
| 10,035,467 B2 | 7/2018 | Flaherty |
| 10,118,563 B2 | 11/2018 | Lindholm et al. |
| 10,144,359 B2 * | 12/2018 | Zander .................. F16B 31/027 |
| 2002/0030074 A1 | 3/2002 | Bove et al. |
| 2004/0256427 A1 | 12/2004 | Settelmayer et al. |
| 2005/0145639 A1 | 7/2005 | Viklund et al. |
| 2009/0102276 A1 * | 4/2009 | Mercat .................. F16B 31/028 301/124.2 |

FOREIGN PATENT DOCUMENTS

| | | |
|---|---|---|
| DE | 19526477 C1 | 9/1996 |
| DE | 19742253 C1 | 5/1999 |
| DE | 202006017802 U1 | 2/2007 |
| EP | 1231112 A2 | 8/2002 |
| EP | 2230412 B1 | 9/2010 |
| EP | 2746600 A1 | 6/2014 |
| EP | 2746600 B1 | 6/2014 |
| FR | 2840571 A1 | 12/2003 |
| JP | H07172452 A | 7/1995 |
| JP | H08258630 A | 10/1996 |
| JP | 11291832 A | 10/1999 |
| WO | 9711865 A1 | 4/1997 |
| WO | 03106221 A1 | 12/2003 |
| WO | 2008145496 A2 | 12/2008 |
| WO | 2015162123 A1 | 10/2015 |

* cited by examiner

US 11,351,928 B2

TORQUE LIMITING CLAMP ACTUATOR

CROSS-REFERENCES TO RELATED APPLICATION

This application claims the benefit under 35 U.S.C. § 119(e) of the priority of U.S. Provisional Patent Application Ser. No. 62/856,671, filed Jun. 3, 2019, the entirety of which is hereby incorporated by reference for all purposes.

FIELD

The disclosure relates to devices for limiting the level of torque applied to an actuator, in particular, a manually controlled clamp actuator.

INTRODUCTION

Clamps of many different types are used to reversibly join or couple components. Often clamps are operated manually. For example, racks for carrying cargo on a vehicle use many different clamp configurations to secure racks to various features and external surfaces of a vehicle. Vehicle rack clamps often use a screw mechanism to adjust clamping position or unclamping position of a clamp. For some clamps it may be crucial to apply a torque in a particular range. For example, applying a torque that is too small may be unsafe, possibly rendering the clamp loose or susceptible to unwanted release while the rack is in use. On the other hand, a clamp may be overly tightened causing other problems such as stripping or deforming threads, or making the clamp difficult to release. Another issue with some clamp actuators is that they may include a handle or other mechanism that may be bulky, cumbersome, or create drag that is undesirable. For example, some clamp actuators may be located in a compartment such as a cargo box where space is limited. Therefore, it may be desirable to create a clamp actuator configuration that is low profile and/or removable or stowable.

SUMMARY

The disclosure provides clamp configurations employing a torque limiting actuator device that may be tuned to manually tighten a clamp effectively without causing problems due to overtightening. In a preferred design a clamp includes a jaw assembly, and an actuator device for moving the jaw assembly between clamped and unclamped positions. The actuator device may include a rotatable handle configured to axially adjust the position of a threaded shaft as the handle is rotated until a threshold level of torque is applied to the threaded shaft by the actuator. The actuator device may include a first set of teeth or protrusions on a first plate that engage a second set of teeth or protrusions on a second plate until a threshold level of torque is applied to the threaded shaft, after which the first set of teeth slide over the second set of teeth. A spring may be used to urge the first set of teeth into the second set of teeth until a threshold level of torque is applied to the threaded shaft, after which the first set of teeth slide over the second set of teeth. The spring may include a plate in a plane perpendicular to the long axis of the threaded shaft. Alternatively, the spring may be a coil spring. The spring may be tunable, allowing the torque limiting threshold for the actuator device to be adjustable and/or selectable. The actuator device may be removable from the jaw assembly. The clamp may be one of a plurality of clamps used to fasten a cargo box to a pair of crossbars on top of a vehicle. The same single actuator device may be used serially for all four clamps.

DESCRIPTION

Figure 1:
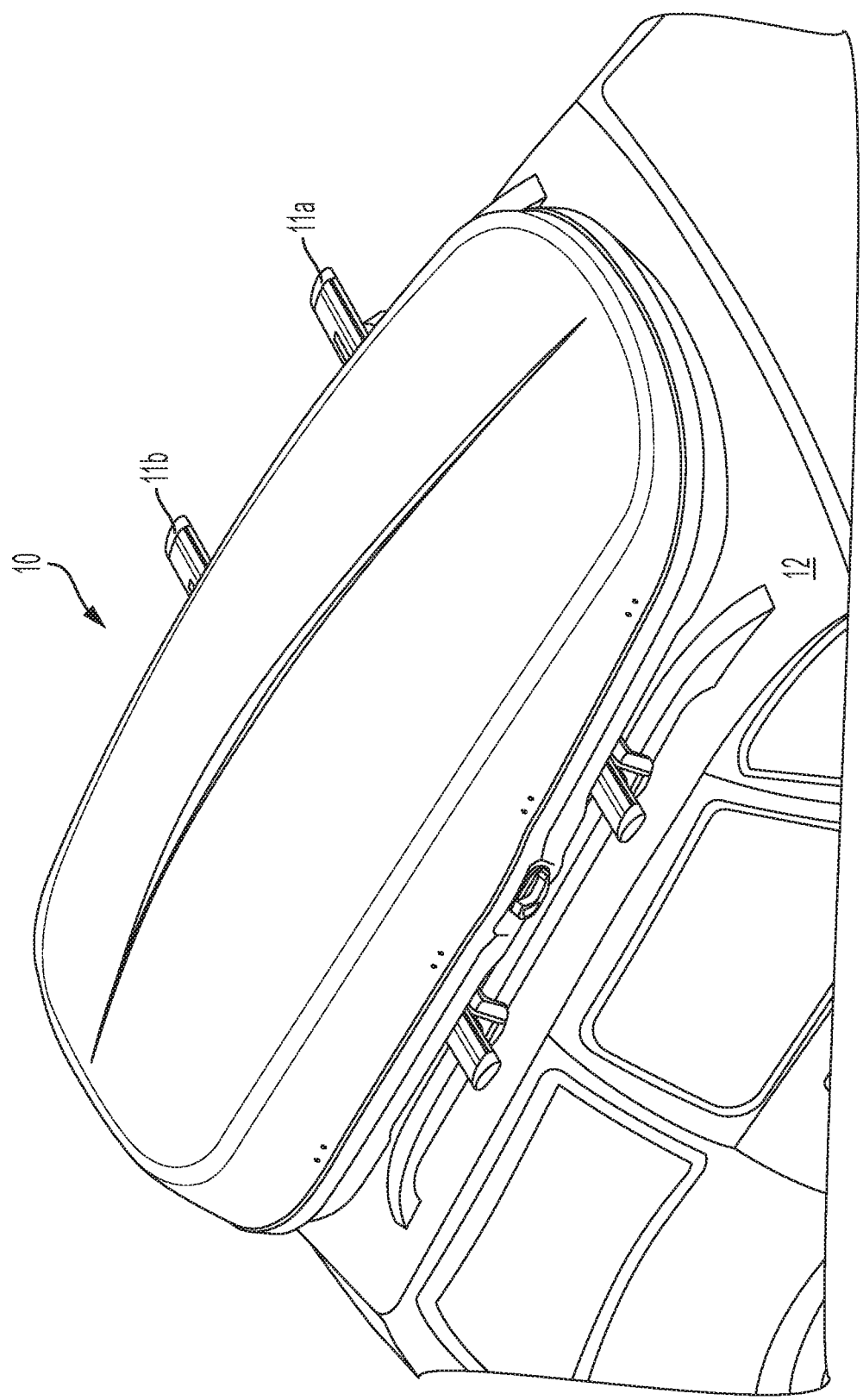
FIG. 1 is a perspective view of a cargo box mounted on top of a vehicle.

This disclosure provides selected examples of clamp actuators. Many alternatives and modifications which may or may not be expressly mentioned, are enabled, implied, currently possessed, and are supported by the disclosure. Unless otherwise specified, a clamp actuator in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

Overview:

A torque limiting clamp actuator device may be employed to manually operate a clamp including a jaw assembly, for example, configured to clamp a crossbar mounted on top of a vehicle. The actuator device may be operable for moving the jaw assembly between clamped and unclamped positions. The clamp device may include a rotatable handle member, and a driver shaft connected to the handle member for engaging the jaw assembly. For example, the actuator device may have a first set of teeth rotationally fixed relative to the handle member, and a second set of teeth rotationally fixed relative to the driver shaft, the first set of teeth engaging the second set of teeth until a threshold level of torque is applied by the handle member to the driver shaft, after which the first set of teeth slide over the second set of teeth, wherein the teeth in at least one of the first and second sets of teeth are spring biased into engagement with the other set of teeth.

For example, the clamp actuator may be adjustable or tunable to alter the threshold level of torque required to cause the first set of teeth to slide over the second set of teeth. A clamp actuator may be removable and stowable when not being used to operate one or more clamps. Teeth or pawls may be connected to or part of a ratchet plate which is rigidly and rotationally fixed to a driver shaft. The first set of teeth may be spring biased into engagement with the second set of teeth. Each of the teeth in the first set of teeth may be mounted on a cantilever member. Further, a spring plate may be mounted in contact with the cantilever member configured to apply a force urging the second set of teeth into engagement with the first set of teeth. The force applied by the spring plate on the cantilever member may be adjustable. A jaw assembly may include a rotatable follower mounted in a fixed axial position along a clamping axis, the follower being keyed to mate with the driver shaft of an actuator device. The jaw assembly may have a moveable jaw member connected to a threaded shaft, the follower being threadably engaged with the threaded shaft, wherein rotation of the follower causes movement of the threaded shaft along the clamping axis, and corresponding movement of the moveable jaw between clamped and unclamped positions. The follower may have a first end portion and a second end portion, the first end portion having a non-circular cavity for receiving a distal end of the driver shaft, and the second end portion having a threaded cavity for receiving a threaded end portion of the threaded shaft. The jaw assembly may be spring biased toward the unclamped position. The handle member may have an inner portion including a plurality of apertures, each aperture partially surrounding a cantilever member, each cantilever member having a distal end supporting one of the first set of teeth extending toward the second set of teeth. In a preferred example, the first set of teeth includes four teeth, each tooth being supported by a separate cantilever member. The driver shaft may have a threaded end portion and a keyed portion, the threaded end portion being configured for fastening to the spring plate, the keyed end portion being configured for mating to the follower. A set of spring plates may be configured for interchangeable use in the actuator device, each spring plate configured to apply a different level of force on the cantilever member.

In another example, a clamping assembly for securing a cargo box on to a pair of crossbars on top of a vehicle may include four clamps fastened to a floor of a cargo box. Each clamp may include a jaw assembly and be adjustable by one single actuator device for moving each respective jaw assembly serially, between clamped and unclamped positions. The single actuator device includes a rotatable handle member. A driver shaft is connected to the handle member for engaging the jaw assembly, A first set of teeth are rotationally fixed relative to the handle member, and a second set of teeth are rotationally fixed relative to the driver shaft. The first set of teeth engage the second set of teeth until a threshold level of torque is applied by the handle member to the driver shaft, after which the first set of teeth slide over the second set of teeth, wherein the teeth in at least one of the first and second sets of teeth are spring biased into engagement with the other set of teeth. The extent of spring bias is tunable without exchanging any parts of the actuator device. The actuator device may be removable for storage when not being used to actuate the jaw assemblies. In another example, a tool for driving rotation of a threaded member includes a handle, and a keyed shaft coupled to the handle via a spring biased releasable torque transfer mechanism.

Examples

The following examples are described with reference to FIGS. 1-12.

Figure 2:
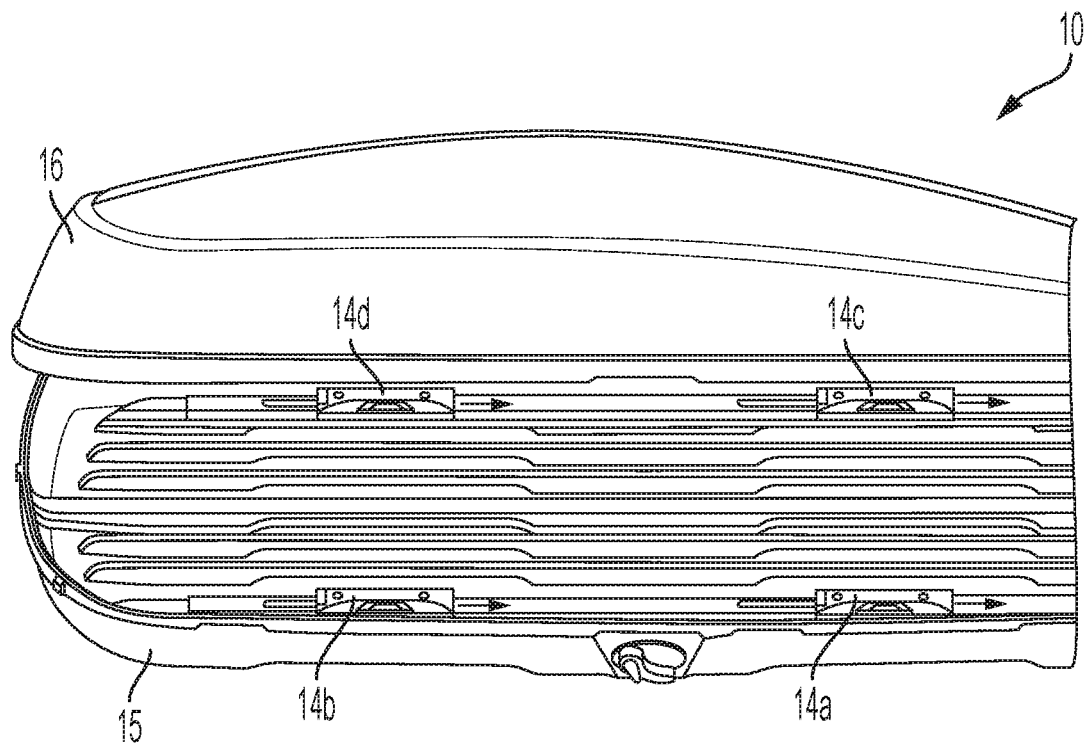
FIG. 2 is the cargo box shown in FIG. 1 from a top perspective, showing clamps used to secure the cargo box to a pair of crossbars.

FIG. 1 shows a cargo box 10 attached to a pair of crossbars 11*a*, 11*b* on top of vehicle 12. FIG. 2 shows cargo box 10 including bottom section 15 and lid 16. Lid 16 is hinged along a longitudinal side of bottom section 15, allowing lid 16 to be moved between a closed position and an open position, as shown in FIG. 2. Four crossbar clamps 14*a*, 14*b*, 14*c*, and 14*d* are shown mounted in the floor of bottom section 15.

Figure 3A:
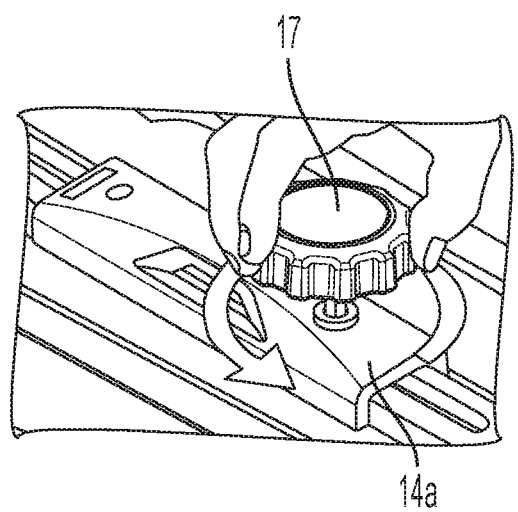
FIG. 3A is a perspective view of a crossbar clamp being operated manually by a clamp actuator.
Figure 3B:
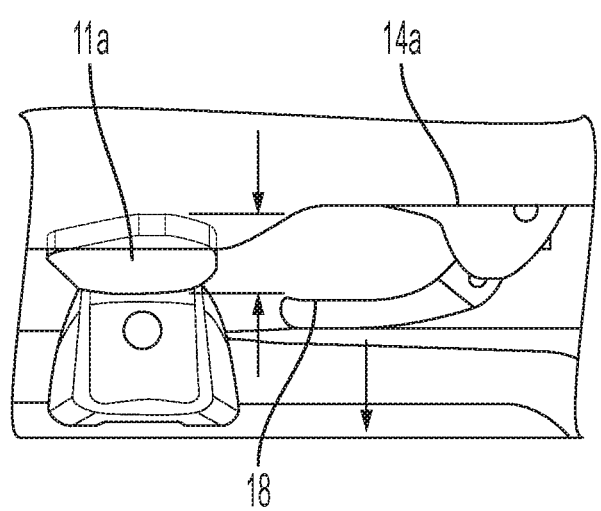
FIG. 3B is a partial side view of a clamp showing a moveable jaw member.

FIG. 3A shows actuator device 17 being manipulated to adjust clamp 14*a* between clamped and unclamped positions. FIG. 3B shows a side view of moveable jaw member 18 in an open position prior to clamping crossbar 11*a*.

Figure 4:
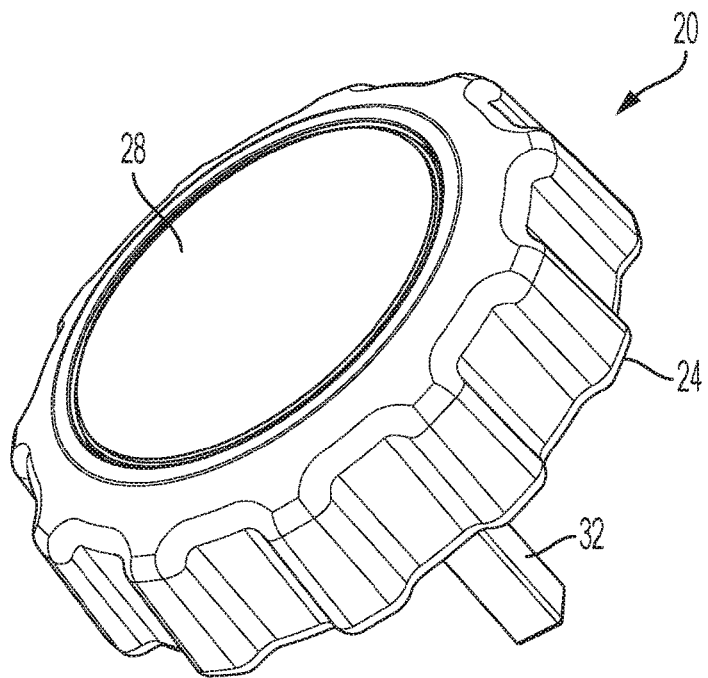
FIG. 4 is a perspective view of an actuator device.

FIG. 4 shows an example of a torque limiting clamp actuator 20. Outer handle portion 24 may be gear shaped, or may have other grip enhancing features such as surface texturing, or high friction materials such as rubber or neoprene. Cover 28 covers an inner chamber in knob 20 which houses a torque limiting mechanism, as described in more detail below. Driver shaft 32 is configured to engage a clamp actuating mechanism. As shown in FIG. 4, driver shaft 32 has a rectangular shape. Other non-circular shapes, for example, triangular, hexagonal, octagonal, may also be used. Alternatively, the distal end of the driver shaft may have a standard, flat, slotted, or other typical screwdriver configuration.

Figure 5:
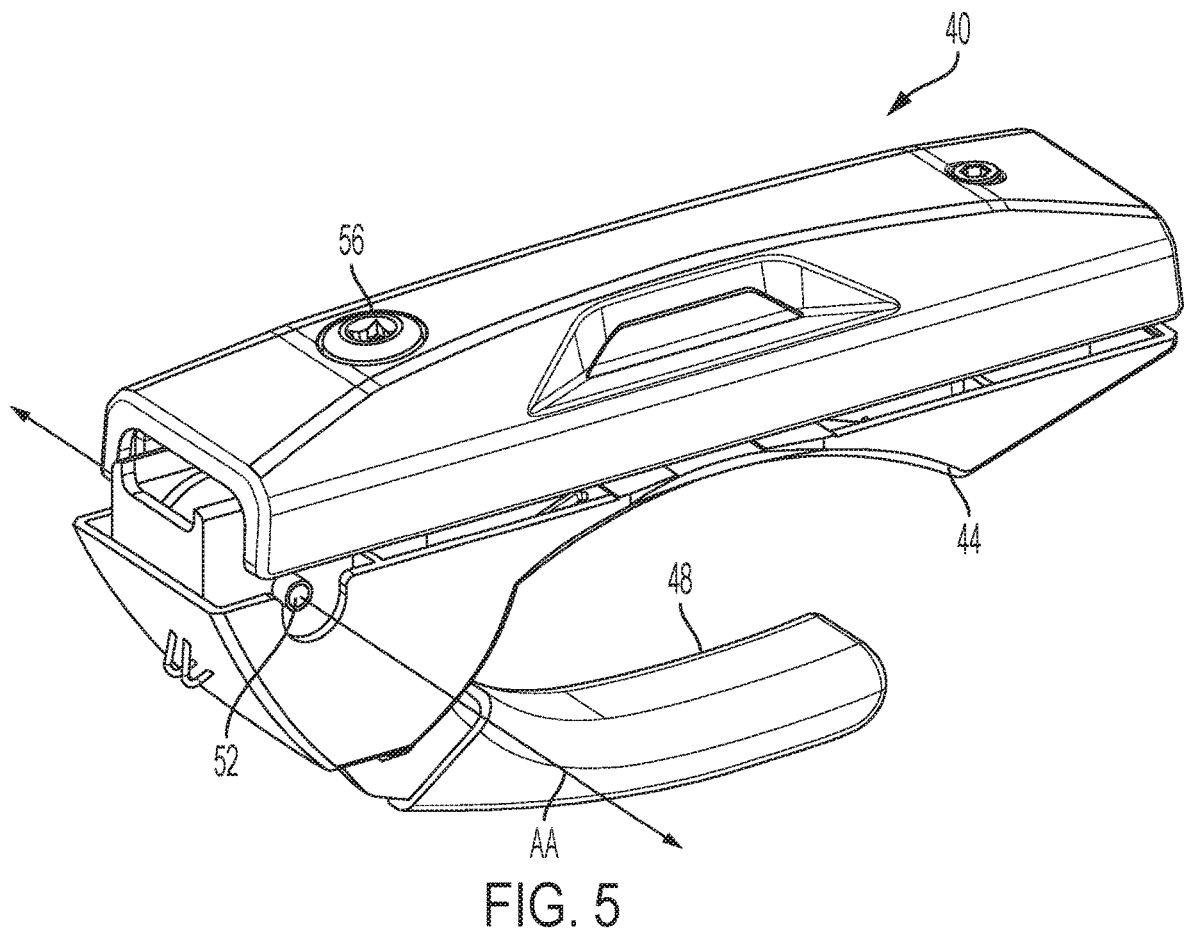
FIG. 5 is a perspective view of a crossbar clamp.

FIG. 5 shows clamp 40 including a jaw assembly having one or more jaws which may be moved relative to each other, between a clamped position and an unclamped position. Stationary jaw 44, and moveable jaw 48 are configured to grip a crossbar. In particular, clamp 40 is designed to be used in conjunction with one or more additional similar or identical clamps to secure a cargo box onto a pair of crossbars on top of a vehicle. Movable jaw 48 pivots around axle 52 or pivot axis AA, in response to rotation of bolt member or follower 56.

Figure 6:
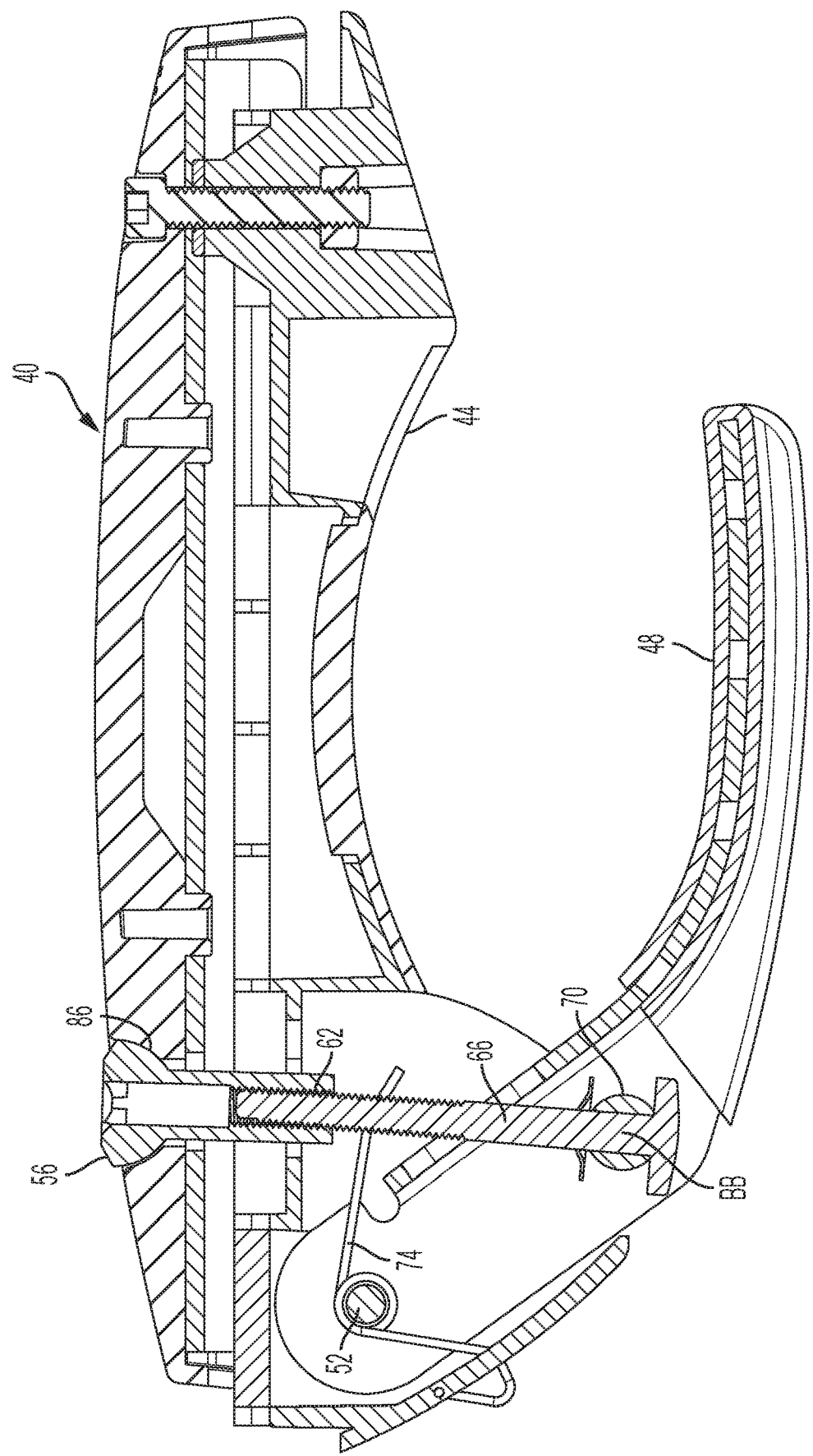
FIG. 6 is a cross-section of the clamp shown in FIG. 5.

FIG. 6 shows a cross-sectional view through clamp 40 of FIG. 5. Bolt member or follower 56 has a threaded internal cavity 62 which engages a threaded portion of threaded shaft member 66. As follower 56 is rotated, threaded shaft member 66 is either retracted or extended, depending on which direction follower 56 is rotated. Extension and retraction of threaded shaft 66 causes rotation of movable jaw structure 48 around axle 52 and axis AA. Spring 74 may be provided to urge jaw structure 48 toward an open or unclamped position. Barrel nut 70 allows the long axis of threaded shaft 66 to rotate around axis BB as jaw structure 48 is moved. Follower 56 has an outer curved surface 86 which also permits some degree of rotation or adjustment as clamp 40 is actuated between clamped and unclamped positions.

Figure 7:
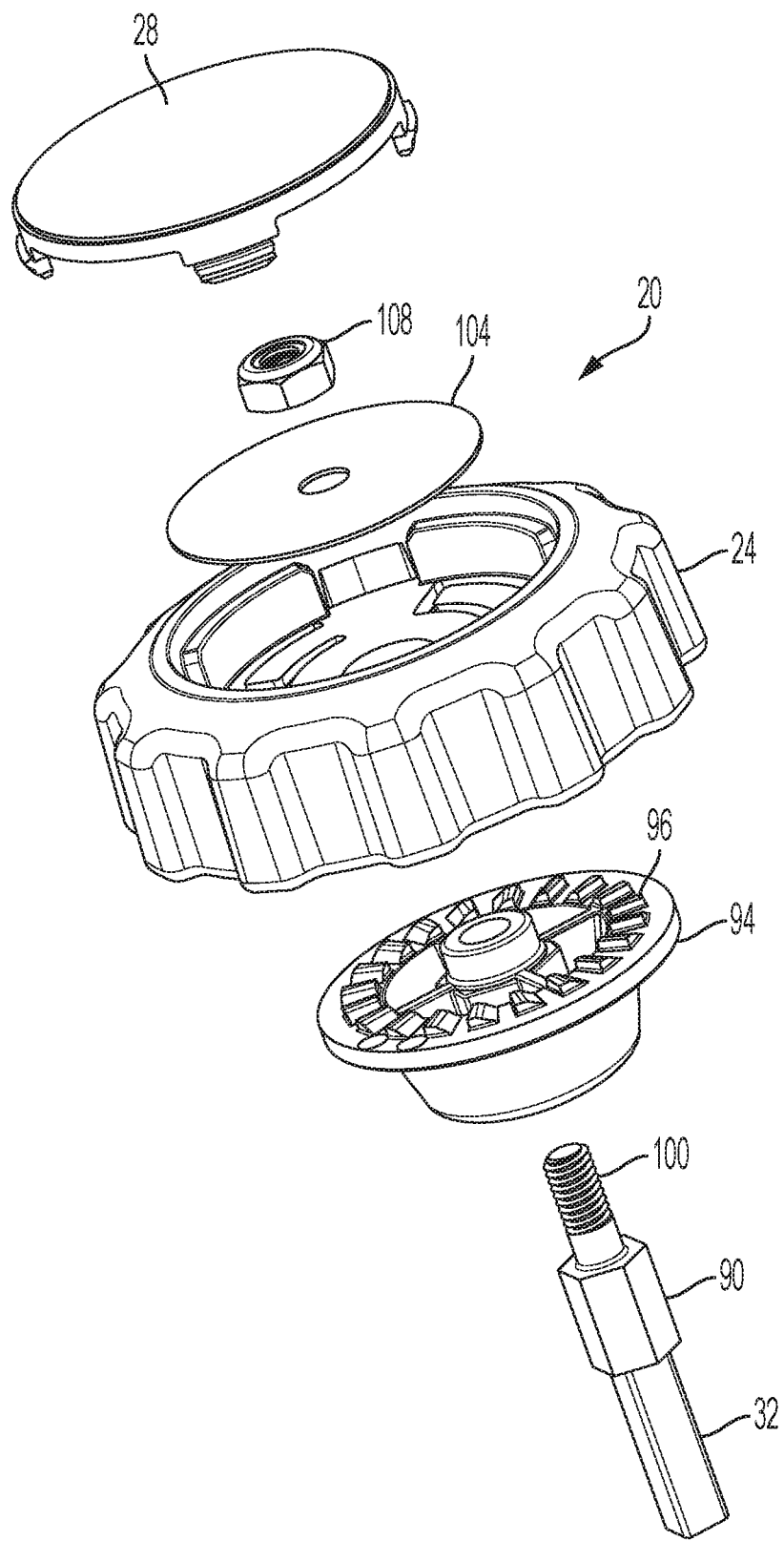
FIG. 7 is an exploded view of the actuator device shown in FIG. 4.

FIG. 7 shows an exploded view of actuator device 20 of FIG. 4. Driver shaft 32 has a non-circular keyed portion 90 configured to engage ratchet plate 94 so that driver shaft 32 always rotates with ratchet plate 94. As shown in FIG. 7, keyed portion 90 has a hexagonal shape. Many other non-circular shapes may also be used. Ratchet plate 94 includes a plurality of wedges or teeth, each tooth having a ramped side and a stepped side, configured to allow rotation of handle 24 to be torque limited in one direction (clamping), but not limited in the opposite direction (unclamping).

Upper threaded portion 100 of driver shaft 32 is configured to extend through ratchet plate 94, through handle 24, spring plate 104, and nut 108. Depending on the flexibility of spring plate 104, and the degree of tightness exerted by shaft 32, a desired torque limiting threshold may be pre-set and/or tuned. Spring plate 104 and nut 108 are contained inside handle 24 by cover 28.

Figure 8:
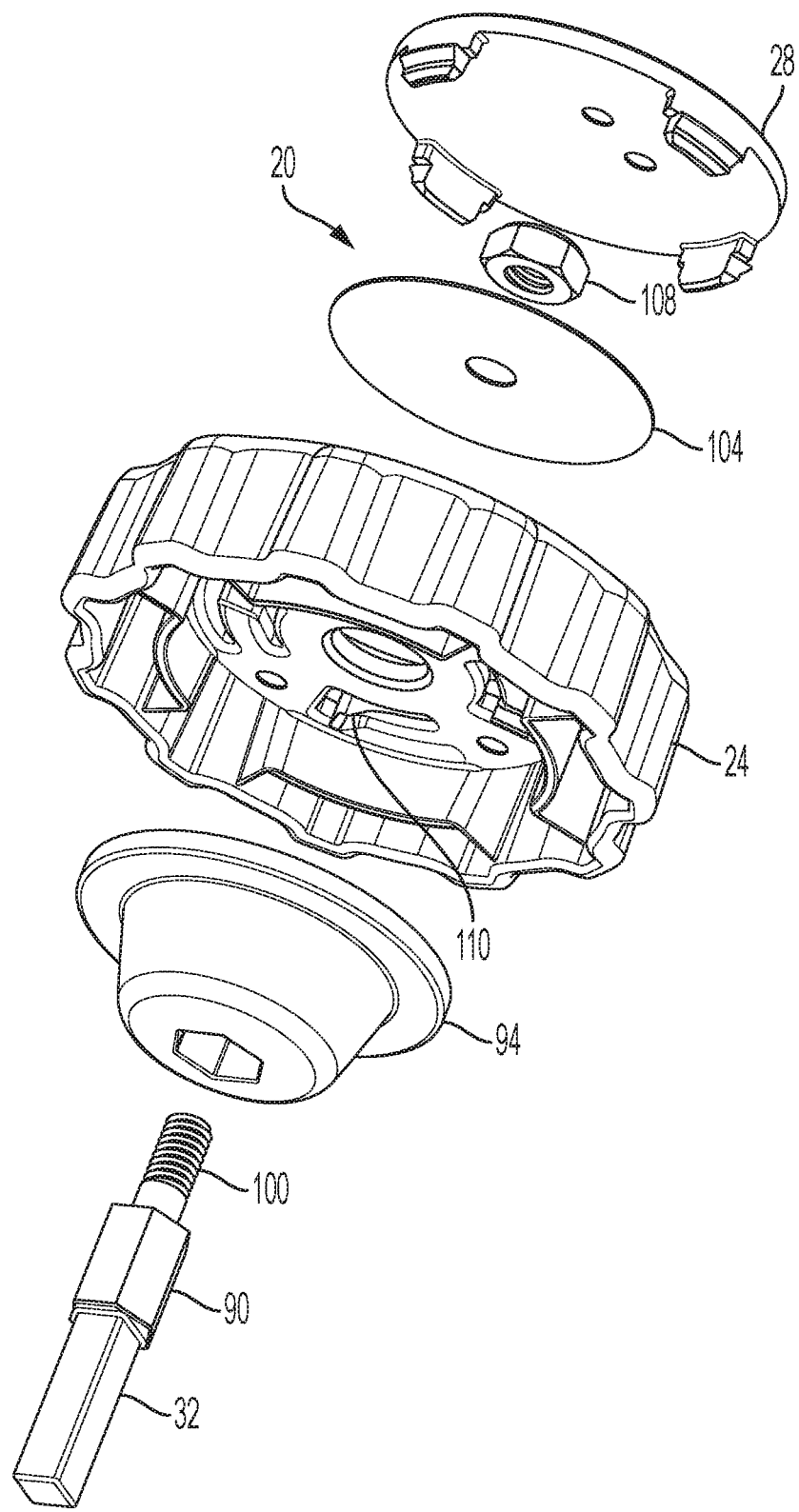
FIG. 8 is another exploded view of the actuator device of FIG. 7 from a different perspective.

FIG. 8 shows a different perspective of exploded actuator device 20 from FIG. 7. As shown in FIG. 8, an underside of handle 24 includes a plurality of pawls or teeth 110 configured to engage wedges or teeth 96 of ratchet plate 94. When clamp 40 is initially being tightened, pawls 110 engage wedges 96 causing ratchet plate 94 and shaft 32 to rotate in conjunction with handle 24. In the final stage of tightening, when a desired level of torque is achieved, pawls 110 slide over wedges 96, in essence, decoupling rotation of handle 24 from further rotation of ratchet plate 94 and driver shaft 32 due to the ramped shape of wedges 96. Handle 24 is still engaged and effective for reverse rotation, i.e. moving jaw 48 towards the unclamped position.

Figure 9:
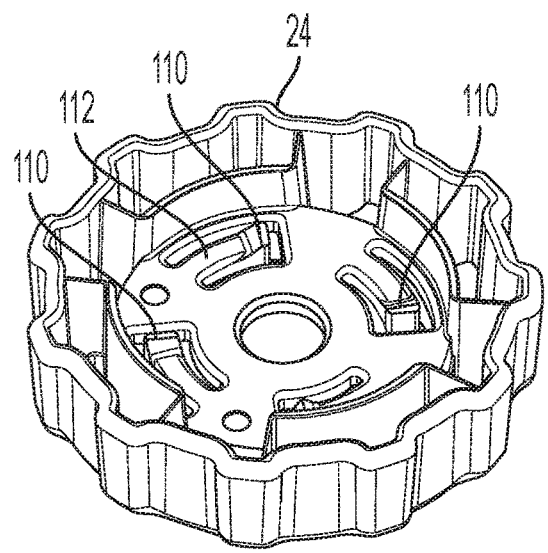
FIG. 9 is a perspective bottom view of a handle member of the actuator device of FIG. 4.
Figure 10:
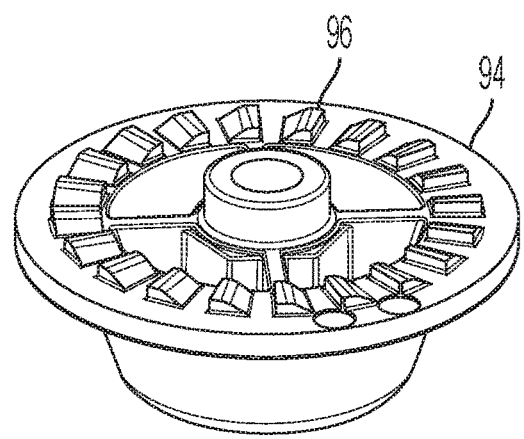
FIG. 10 is a perspective view of a ratchet plate employed in the actuator device of FIG. 4.

FIG. 9 shows another underside view of handle 24 including pawls 110. Pawls 110 have a ramped surface configured to engage ramped surfaces on wedges 96 of ratchet plate 94. Each pawl 110 is positioned at a distal end of a cantilever portion 112 which may provide some degree of spring action in a direction approximately parallel to the rotational axis of handle 24. The torque limiting device may also provide an audible signal that the desired torque level has been reached, for example by creating a "clicking" sound when the pawls of the handle slide over the wedges of ratchet plate 94. FIG. 10 shows a top perspective view of ratchet plate 94 and wedges or teeth 96 which engage pawls 110 of handle 24.

Figure 11:
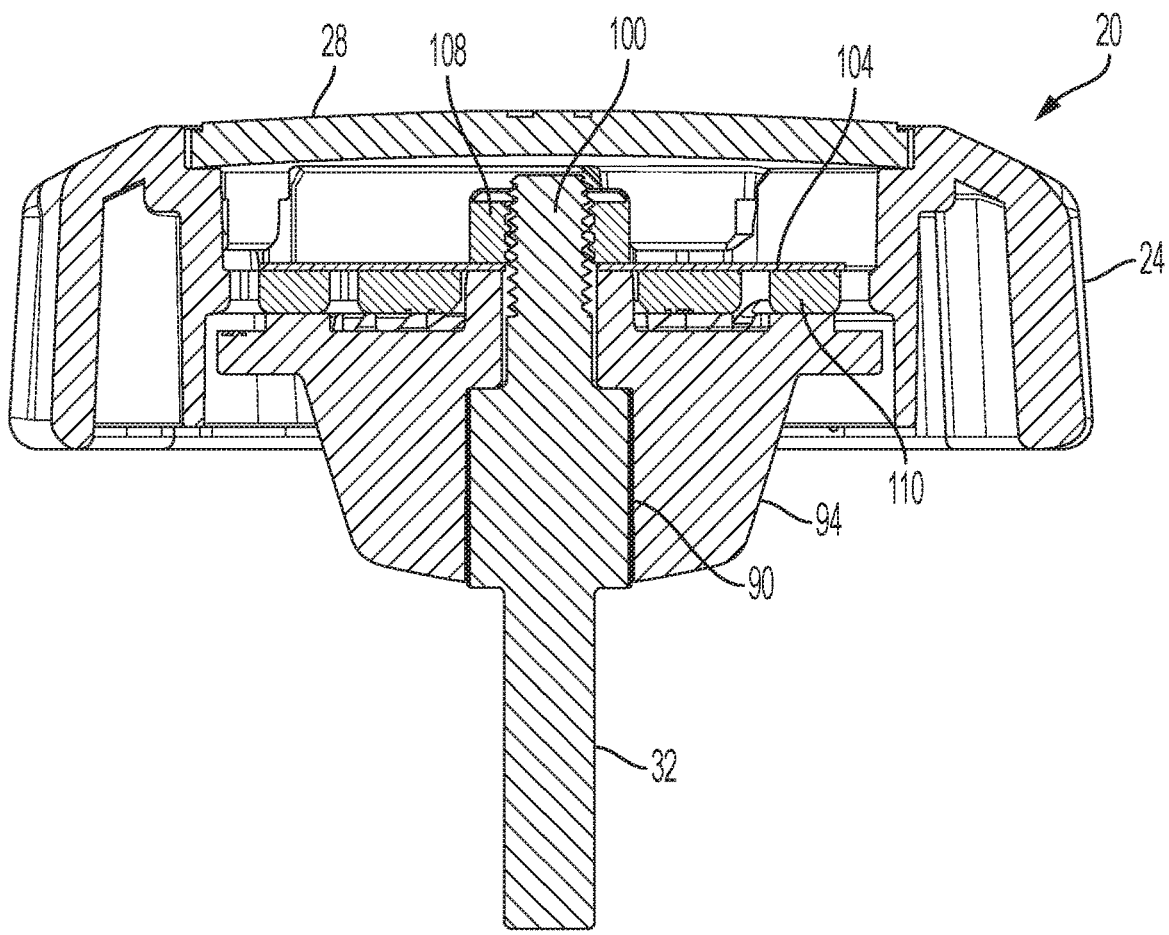
FIG. 11 is a cross-sectional view of the actuator device of FIG. 4.

FIG. 11 shows a cross-section though actuator device 20. Driver shaft 32 includes keyed portion 90 which is rotationally locked together with ratchet plate 94. Ratchet plate 94 is contained inside handle 24 by nut 108 engaging threaded portion 100 of driver shaft 32. Spring plate 104 is sandwiched between nut 108 and ratchet plate 94 and applies a desired amount of force urging engagement between wedges 96 of ratchet plate 94 and pawls or teeth 110 of handle 24, thereby increasing a threshold level of torque permitted for turning driver shaft 32 before pawls 110 slip over wedges 96. Cover 28 encloses the torque limiting assembly inside handle 24.

In a preferred example of implementation of a torque limiting actuator, as shown in the Figures, and described above, a cargo box may be secured to a pair of crossbars on top of a vehicle using an exemplary torque limiting actuation device. A handle configured for controlling actuation of the clamp may be removable when the clamp is not being manipulated. Uncoupling the actuator may provide a number of advantages. For example, the same actuator may be used to tighten each of the clamps. Additionally, removal of the actuator provides a lower profile clamping configuration inside the box, enhancing the usable space and volume of the box for carrying cargo.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. It is noted that various combinations and subcombinations of components have been described. Any of the components described or shown may be combined with any other components described or shown to create additional embodiments.

Illustrative Combinations and Additional Examples

This section describes additional aspects and features of clamps and clamp actuators, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A. A clamp including a jaw assembly, and an actuator device for moving the jaw assembly between clamped and unclamped positions, wherein the actuator device includes a rotatable handle configured to axially adjust the position of a threaded shaft as the handle is rotated until a threshold level of torque is applied to the threaded shaft by the actuator.

A1. The clamp of A, wherein the actuator device has a first set of teeth that engage a second set of teeth until a threshold level of torque is applied to the threaded shaft, after which the first set of teeth slide over the second set of teeth.

A2. The clamp of any of A-A1, wherein a spring urges the first set of teeth into the second set of teeth until a threshold level of torque is applied to the threaded shaft, after which the first set of teeth slide over the second set of teeth.

A3. The clamp of any of A-A2, wherein the spring includes a plate.

A4. The clamp of any of A-A3, wherein the spring is a coil spring.

A5. The clamp of any of A-A4, wherein the spring is tunable, allowing the torque limit threshold for the actuator device to be adjustable and/or selectable.

A6. The clamp of any of A-A5, wherein the actuator device is removable from the jaw assembly.

A7. The clamp of any of A-A6, wherein the clamp is one of four clamps used to fasten a cargo box to a pair of crossbars.

A8. The clamp of any of A-A7, wherein the same actuator device may used serially for all four clamps.

B. A clamp comprising:
a jaw assembly, and
an actuator device for moving the jaw assembly between clamped and unclamped positions, including:
 a rotatable handle member,
 a driver shaft connected to the handle member for engaging the jaw assembly, and
 a first set of teeth rotationally fixed relative to the handle member, and a second set of teeth rotationally fixed relative to the driver shaft, the first set of teeth engaging the second set of teeth until a threshold level of torque is applied by the handle member to the driver shaft, after which the first set of teeth slide over the second set of teeth, wherein the teeth in at least one of the first and second sets of teeth are spring biased into engagement with the other set of teeth.

B1. The clamp of B, wherein the extent of spring bias is tunable without exchanging any parts of the actuator device.

B2. The clamp of B or B1, wherein the actuator device is removable for storage when not being used to actuate the jaw assembly.

B3. The clamp of any of B-B2, further comprising:
a ratchet plate rigidly connected to the driver shaft, wherein the second set of teeth are on a ratchet plate.

B4. The clamp of any of B-B3, wherein the first set of teeth are spring biased into engagement with the second set of teeth.

B5. The clamp of any of B-B4, wherein each of the teeth in the first set of teeth is mounted on a cantilever member.

B6. The clamp of any of B-B5, further comprising:
a spring plate mounted in contact with the cantilever member configured to apply a force urging the second set of teeth into engagement with the first set of teeth.

B7. The clamp of any of B-B6, wherein the force applied by the spring plate on the cantilever member is adjustable.

B8. The clamp of any of B-B7, wherein the jaw assembly includes a rotatable follower mounted in a fixed axial position along a clamping axis, the follower being keyed to mate with the driver shaft.

B9. The clamp of any of B-B8, wherein the jaw assembly has a moveable jaw member connected to a threaded shaft, the follower being threadably engaged with the threaded shaft, wherein rotation of the follower causes movement of the threaded shaft along the clamping axis, and corresponding movement of the moveable jaw between clamped and unclamped positions.

B10. The clamp of any of B-B9, wherein the follower has a first end portion and a second end portion, the first end portion having a non-circular cavity for receiving a distal end of the driver shaft, and the second end portion having threaded cavity for receiving a threaded end portion of the threaded shaft.

B11. The clamp of any of B-B10, wherein the jaw assembly is spring biased toward the unclamped position.

B12. The clamp of any of B-B11, wherein the handle member has an inner portion having a plurality of apertures, each aperture partially surrounding a cantilever member, each cantilever member having a distal end supporting one of the first set of teeth extending toward the second set of teeth.

B13. The clamp of any of B-B12, wherein first set of teeth has four teeth, each tooth being supported by a separate cantilever member.

B14. The clamp of any of B-B13, wherein the driver shaft has threaded end portion and a keyed portion, the threaded end portion being configured for fastening to the spring plate, the keyed end portion being configured for mating to the follower.

B15. The clamp of any of B-B14, further comprising:
a set of spring plates configured for interchangeable use in the actuator device, each spring plate configured to apply a different level of force on the cantilever member.

C. A clamping assembly for securing a cargo box on to a pair of crossbars on top of a vehicle, comprising:
four clamps fastened to a floor of a cargo box, each clamp having a jaw assembly and being adjustable by one single actuator device for moving each respective jaw assembly serially between clamped and unclamped positions, the single actuator device including:
a rotatable handle member,
a driver shaft connected to the handle member for engaging the jaw assembly, and
a first set of teeth rotationally fixed relative to the handle member, and a second set of teeth rotationally fixed relative to the driver shaft, the first set of teeth engaging the second set of teeth until a threshold level of torque is applied by the handle member to the driver shaft, after which the first set of teeth slide over the second set of teeth, wherein the teeth in at least one of the first and second sets of teeth are spring biased into engagement with the other set of teeth.

C1. The clamping assembly of C, wherein the extent of spring bias is tunable without exchanging any parts of the actuator device.

C2. The clamping assembly of C or C1, wherein the actuator device is removable for storage when not being used to actuate the jaw assemblies.

D. A tool for driving rotation of a threaded member, comprising:
a handle, and
a keyed shaft coupled to the handle via a spring biased releasable torque transfer mechanism.

CONCLUSION

The disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and sub-combinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

The invention claimed is:

1. A clamp comprising:
a jaw assembly, and
an actuator device for moving the jaw assembly between clamped and unclamped positions, including:
a rotatable handle member,
a driver shaft connected to the handle member for engaging the jaw assembly,
a first set of teeth rotationally fixed relative to the handle member, and a second set of teeth rotationally fixed relative to the driver shaft, the first set of teeth engaging the second set of teeth until a threshold level of torque is applied by the handle member to the driver shaft, after which the first set of teeth slide over the second set of teeth, wherein each of the teeth in the first set of teeth is mounted on a cantilever member, and
a spring plate mounted in contact with the cantilever members, configured to apply a force on the cantilever members.

2. The clamp of claim 1, wherein the force applied by the spring plate is tunable without exchanging any parts of the actuator device.

3. The clamp of claim 2, wherein the force applied by the spring plate is tunable by tightening a threaded portion of the driver shaft into a nut, to urge the spring plate against the cantilever members.

4. The clamp of claim 1, wherein the actuator device is removeable for storage when not being used to actuate the jaw assembly.

5. The clamp of claim 1, further comprising:
a ratchet plate rigidly connected to the driver shaft, wherein the second set of teeth are on the ratchet plate.

6. The clamp of claim 1, wherein the force applied by the spring plate on the cantilever members is adjustable.

7. The clamp of claim 1, further comprising:
a set of spring plates configured for interchangeable use in the actuator device, each spring plate configured to apply a different level of force on the cantilever members.

8. The clamp of claim 1, wherein the driver shaft has a threaded end portion and a keyed portion, the threaded end portion being configured for fastening to the spring plate, the keyed end portion being configured for mating to a rotatable follower mounted in a fixed axial position along a clamping axis.

9. The clamp of claim 1, wherein the jaw assembly includes a rotatable follower mounted in a fixed axial position along a clamping axis, the follower being keyed to mate with the driver shaft.

10. The clamp of claim 9, wherein the jaw assembly has a moveable jaw member connected to a threaded shaft, the follower being threadably engaged with the threaded shaft, wherein rotation of the follower causes movement of the threaded shaft along the clamping axis, and corresponding movement of the moveable jaw between clamped and unclamped positions.

11. The clamp of claim 10, wherein the follower has a first end portion and a second end portion, the first end portion having a non-circular cavity for receiving a distal end of the driver shaft, and the second end portion having threaded cavity for receiving a threaded end portion of the threaded shaft.

12. The clamp of claim 1, wherein the jaw assembly is spring biased toward the unclamped position.

13. The clamp of claim 1, wherein the handle member has an inner portion having a plurality of apertures, each aperture partially surrounding one of the cantilever members, each cantilever member having a distal end supporting one of the first set of teeth extending toward the second set of teeth.

14. The clamp of claim 1, wherein the first set of teeth has four teeth, each tooth being supported by a separate cantilever member.

15. The clamp of claim 1, wherein the spring plate is flat.

16. The clamp of claim 1, wherein the rotatable handle member, the cantilever members, and the first set of teeth are a single, unitary component.

17. A clamping assembly for securing a cargo box on to a pair of crossbars on top of a vehicle, comprising:
four clamps fastened to a floor of a cargo box, each clamp having a jaw assembly and being adjustable by one single actuator device for moving each respective jaw assembly serially between clamped and unclamped positions, the single actuator device including:
a rotatable handle member,
a driver shaft connected to the handle member for engaging the jaw assembly,
a first set of teeth rotationally fixed relative to the handle member, and a second set of teeth rotationally fixed relative to the driver shaft, the first set of teeth engaging the second set of teeth until a threshold level of torque is applied by the handle member to the driver shaft, after which the first set of teeth slide over the second set of teeth, wherein each of the teeth in the first set of teeth is mounted on a cantilever member, and
a spring plate mounted in contact with the cantilever members, configured to apply a force on the cantilever members.

18. The clamping assembly of claim 17, wherein the force applied by the spring plate is tunable without exchanging any parts of the actuator device.

19. The clamping assembly of claim 17, wherein the actuator device is removeable for storage when not being used to actuate the jaw assemblies.

20. A tool for driving rotation of a threaded member, comprising:
a handle, and
a keyed shaft coupled to the handle via a releasable torque transfer mechanism, the torque transfer mechanism including:
multiple cantilever members, and
a spring plate mounted in contact with the cantilever members, configured to apply a force on the cantilever members.

* * * * *